US008421408B2

(12) United States Patent
Hamedi-Hagh et al.

(10) Patent No.: US 8,421,408 B2
(45) Date of Patent: Apr. 16, 2013

(54) EXTENDED RANGE WIRELESS CHARGING AND POWERING SYSTEM

(76) Inventors: Sotoudeh Hamedi-Hagh, San Jose, CA (US); Sooseok Oh, Santa Clara, CA (US); Dae-Hee Park, Seoul (KR)

( * ) Notice: Subject to any disclaimer, the term of this patent is extended or adjusted under 35 U.S.C. 154(b) by 278 days.

(21) Appl. No.: 12/837,639

(22) Filed: Jul. 16, 2010

(65) Prior Publication Data

US 2011/0181237 A1  Jul. 28, 2011

Related U.S. Application Data (60) Provisional application No. 61/297,744, filed on Jan. 23, 2010.

(51) Int. Cl.
*H02J 7/00* (2006.01)
*H01F 27/42* (2006.01)

(52) U.S. Cl.
USPC .......................................... 320/108; 307/104

(58) Field of Classification Search .................. 320/108; 307/104
See application file for complete search history.

(56) References Cited

U.S. PATENT DOCUMENTS

| 6,856,291 | B2 | 2/2005 | Mickle |
| 7,173,343 | B2 | 2/2007 | Kugel |
| 2006/0184209 | A1 | 8/2006 | John |
| 2006/0281435 | A1 | 12/2006 | Shearer |
| 2007/0109121 | A1 | 5/2007 | Cohen |
| 2007/0191075 | A1 | 8/2007 | Greene |
| 2008/0054638 | A1 | 3/2008 | Greene |
| 2008/0079392 | A1 | 4/2008 | Baarman |
| 2008/0119241 | A1 | 5/2008 | Dorogusker |
| 2008/0143188 | A1 | 6/2008 | Adest |
| 2008/0167088 | A1 | 7/2008 | Rabu |
| 2008/0204005 | A1 | 8/2008 | Wang |
| 2008/0210762 | A1 | 9/2008 | Osada |
| 2008/0217309 | A1 | 9/2008 | Rodgers |
| 2008/0231233 | A1 | 9/2008 | Thornton |
| 2008/0233911 | A1 | 9/2008 | Baker |
| 2008/0297103 | A1 | 12/2008 | Windsor |
| 2009/0058189 | A1* | 3/2009 | Cook et al. ................... 307/104 |
| 2009/0058361 | A1 | 3/2009 | John |
| 2009/0171404 | A1 | 7/2009 | Irani |
| 2009/0200985 | A1 | 8/2009 | Zane |
| 2009/0209303 | A1 | 8/2009 | Kroll |

* cited by examiner

*Primary Examiner* — M'baye Diao
(74) *Attorney, Agent, or Firm* — Gerald R Prettyman (57) ABSTRACT

Exemplary embodiments provide for an apparatus and a method for extended range wireless powering and charging of low-power electrical devices. The apparatus and method may comprise circuits and steps for receiving radio frequency energy; circuits and steps for resonating the radio frequency energy to increase the amplitude of the radio frequency energy; circuits and steps for retransmitting the resonated radio frequency energy; circuits and steps for receiving the retransmitted resonated radio frequency energy; and circuits and steps for converting the retransmitted resonated radio frequency energy into direct current for the extended range wireless powering and charging of low-power electrical devices.

13 Claims, 8 Drawing Sheets

EXTENDED RANGE WIRELESS CHARGING AND POWERING SYSTEM

CROSS-REFERENCE TO RELATED APPLICATIONS

This application claims the benefit of priority of U.S. Provisional Application Ser. No. 61/297,744, titled "Wireless Charging and Powering System and Devices", filed Jan. 23, 2010, which is hereby incorporated by reference.

BACKGROUND OF THE INVENTION

1. Field of the Invention

This invention pertains to a wireless charging and powering system, and particularly to extending a wireless charging and powering system for use in charging and powering low-power portable electronic devices.

2. Description of the Prior Art

Portable electronics devices such as laptops, smart phones and organizers are becoming more functional and more important to daily life. These portable devices often have high power requirements and are powered by rechargeable batteries. To assure continuous high power operation, the rechargeable batteries need regular recharging. Conventional charging methods for these rechargeable batteries include connecting AC/DC or DC/DC adapters to the electronic devices using cables. A multitude of cable and power standards for charging the rechargeable batteries has created a burden for the user of multiple devices to also carry a multitude of non-interchangeable charging devices.

The charging distance must also be surmounted. Many wireless charging systems use a high power far field transceiver for long-range communications or use proximity-coupling near-field systems for short-range communications.

SUMMARY OF THE INVENTION

Exemplary embodiments provide for a distributed resonance apparatus for extended range wireless powering and charging of a low-power electrical device comprising a receiving antenna device for receiving radiated energy having at least one frequency in the radio frequency range, an input port connected to the receiving antenna, the input port having a positive terminal and a negative terminal, a first electrical leg comprising the positive terminal of the input port, the positive terminal connected in series to a first end of an inductor, a second end of the inductor connected in series to a first end of a resistor, a second end of the resistor connected in series to a positive terminal of an output port, a second electrical leg comprising the negative terminal of the input port, an electrical ground, a negative terminal of an output port, and a capacitor connected in parallel between the ground and the positive terminal of the input port, wherein the first electrical leg and the second electrical leg induce resonance in the at least one frequency in the radio frequency range, and a transmitting antenna for wirelessly transmitting the resonated radio frequency energy. Various embodiments of the apparatus may use at least one frequency in the radio frequency range of approximately 125 kHz, 13.56 MHz, 850 MHz, 1800 MHz, 2400 MHZ or 5000 MHZ.

In some embodiments, the distributed resonance apparatus for extended range wireless powering and charging of a low-power electrical device may further comprise a radio frequency transmitting circuit for transmitting the radio frequency energy through an electro-magnetically coupled short distance. In some embodiments, the distributed resonance apparatus for extended range wireless powering and charging of a low-power electrical device may further comprise an electro-magnetic strength detection circuit for determining the distance between the radio frequency transmitting circuit and a radio frequency energy receiving circuit.

In some embodiments, the apparatus for extended range wireless charging and powering of a low-power electrical device may comprise a circuit for converting the retransmitted and resonated radio frequency energy into direct current comprising a double-polarity receiver-multiplier with a plurality of odd-order capacitors and a plurality of even-order capacitors and a plurality of rectifying diodes for converting the retransmitted radio frequency energy into direct current for charging and powering of low-power electrical devices.

In some embodiments, the apparatus for extended range wireless charging and powering of a low-power electrical device may comprise a circuit for converting the retransmitted and resonated radio frequency energy into direct current comprising a negative voltage receiver-multiplier with a plurality of odd-order capacitors and a plurality of even-order capacitors and a plurality of rectifying diodes for converting the retransmitted radio frequency energy into direct current for charging and powering of low-power electrical devices.

In some embodiments, the apparatus for extended range wireless charging and powering of a low-power electrical device may comprise a circuit for converting the retransmitted and resonated radio frequency energy into direct current comprising a positive voltage receiver-multiplier with a plurality of odd-order capacitors and a plurality of even-order capacitors and a plurality of rectifying diodes for converting the retransmitted radio frequency energy into direct current for charging and powering of low-power electrical devices.

Also disclosed is a method for extended wireless charging and powering of a low-power electrical device comprising receiving transmitted radio frequency energy, directing at least one frequency of the radio frequency energy into a tuned radio frequency resonance circuit, resonating the radio frequency energy through the tuned radio frequency resonance circuit, and retransmitting the resonated radio frequency energy.

The method for extended wireless charging and powering of a low-power electrical device may further comprise receiving the resonated retransmitted radio frequency energy.

The method for extended wireless charging and powering of a low-power electrical device may further comprise converting the resonated retransmitted radio frequency energy into direct current, or powering a low power digital device.

In some embodiments of the method for extended wireless charging and powering of a low-power electrical device, the direct current is positive current.

In some embodiments of the method for extended wireless charging and powering of a low-power electrical device, the direct current is negative current.

In some embodiments, a method for extended wireless charging and powering of a low-power electrical device may comprise determining the rate at which electrical current should be delivered to an electrical device at avoid damage to the electrical device, detecting among ambient radio frequencies an appropriate power source, and delivering an appropriate radio frequency energy to the electrical device to avoid damage to the electrical device.

DETAILED DESCRIPTION OF THE INVENTION

Figure 1:
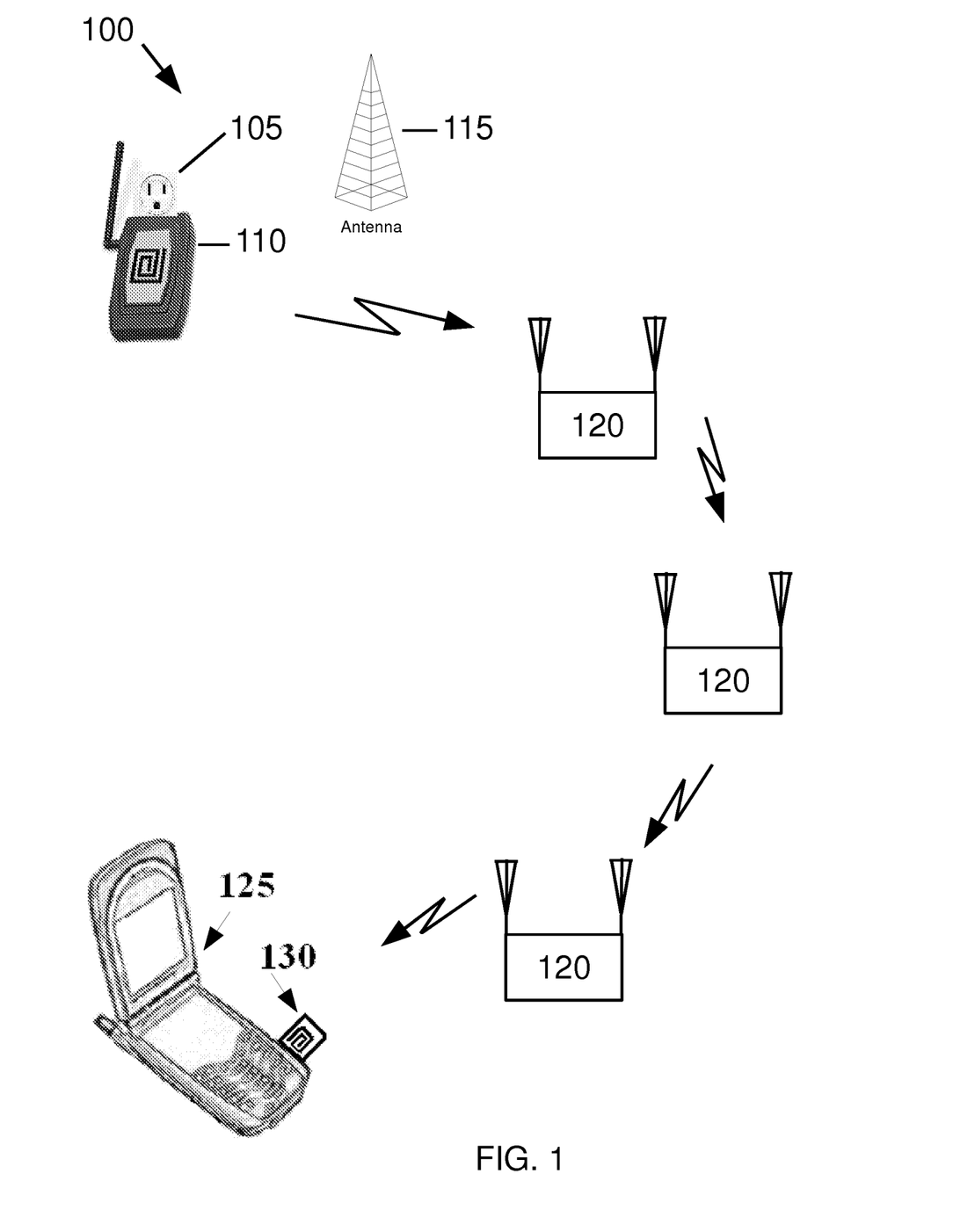
FIG. 1 is an illustration of a system for extended range wireless charging and powering and powering of a typical portable electronic device.

FIG. 1 is an illustration of a system 100 for the extended range wireless charging and powering of a typical portable electronic device. The system 100 may comprise an electrical outlet 105, a power converter-transmitter 110 or a commercial or private radio frequency antenna 115, a distributed resonator 120, a digital device 125, and a power receiver-converter 130.

The electrical outlet 105 may be typical commercial or residential outlet in any country, or may be an electrical outlet in an automobile or vehicle or vessel, or may be an electrical outlet from a generator, inverter, or a battery or other electrical generating or electrical storage device. In any embodiment, the electrical outlet may provide electrical power at any voltage or amperage.

The power converter-transmitter 110 may be any device for receiving electrical power from the electrical outlet 105, converting the electrical power to radio frequency energy, and transmitting the radio frequency energy. In some embodiments, the power converter-transmitter 110 is specifically tuned for transmitting a specified frequency for charging or powering a digital device. In some embodiments, the power converter-transmitter 110 may be configured to receive alternating current. In other embodiments, the power converter-transmitter 110 may be configured to receive direct current. In any embodiment, the power converter-transmitter 110 may receive electrical power at any voltage or amperage.

The antenna 115 may be any commercial or private device for transmitting radio frequency energy at any frequency or any wavelength. In some embodiments, the antenna 115 may be transmitting low-power radio frequency signals. Some examples are WiFi (e.g., 2400 MHz, 5800 MHz), Bluetooth (e.g., 2402-2480 MHz), radio frequency identification systems (RFID, e.g., 125 kHz, 13.56 MHz), WiMAX (e.g., 2.3-2.5 GHz and 3.4-3.5 GHz), ZigBee (a.k.a. personal area networks in the 915 MHz and 2450 MHz.) or Near Field Communication (NFC) systems.

In some embodiments, the antenna 115 may be transmitting high-power radio frequency signals. Some examples of high-power radio frequency systems include point-to-point communication antennas, radio and television broadcasting, cellular telephones (e.g., 850 (i.e., 800-900) MHZ, 1800 MHz, 1900 MHZ, etc.), personal communications services, pagers, cordless telephones (e.g., 1900 (i.e., 1929-1930) MHz, 2400 MHz, etc.), business radio, radio communications for police and fire departments, amateur radio, and satellite communications, long-distance transmission towers, radar and other industrial applications.

The distributed resonator 120 is a low-power near-field resonance system. As described below, the distributed resonator 120 receives radio frequency (RF) energy from an RF source and retransmits the radio frequency energy with little or no energy loss.

The digital device 125 may be any digital device requiring low power electrical energy. The digital device 125 may be a cellular telephone, a personal digital assistant, a laptop computer, or other portable digital device.

The receiver-converter 130 receives radio frequency energy, converts the radio frequency energy to low power direct current, and feeds the low power direct current to the battery or the input power line of the portable device or electronic equipment.

Figure 2:
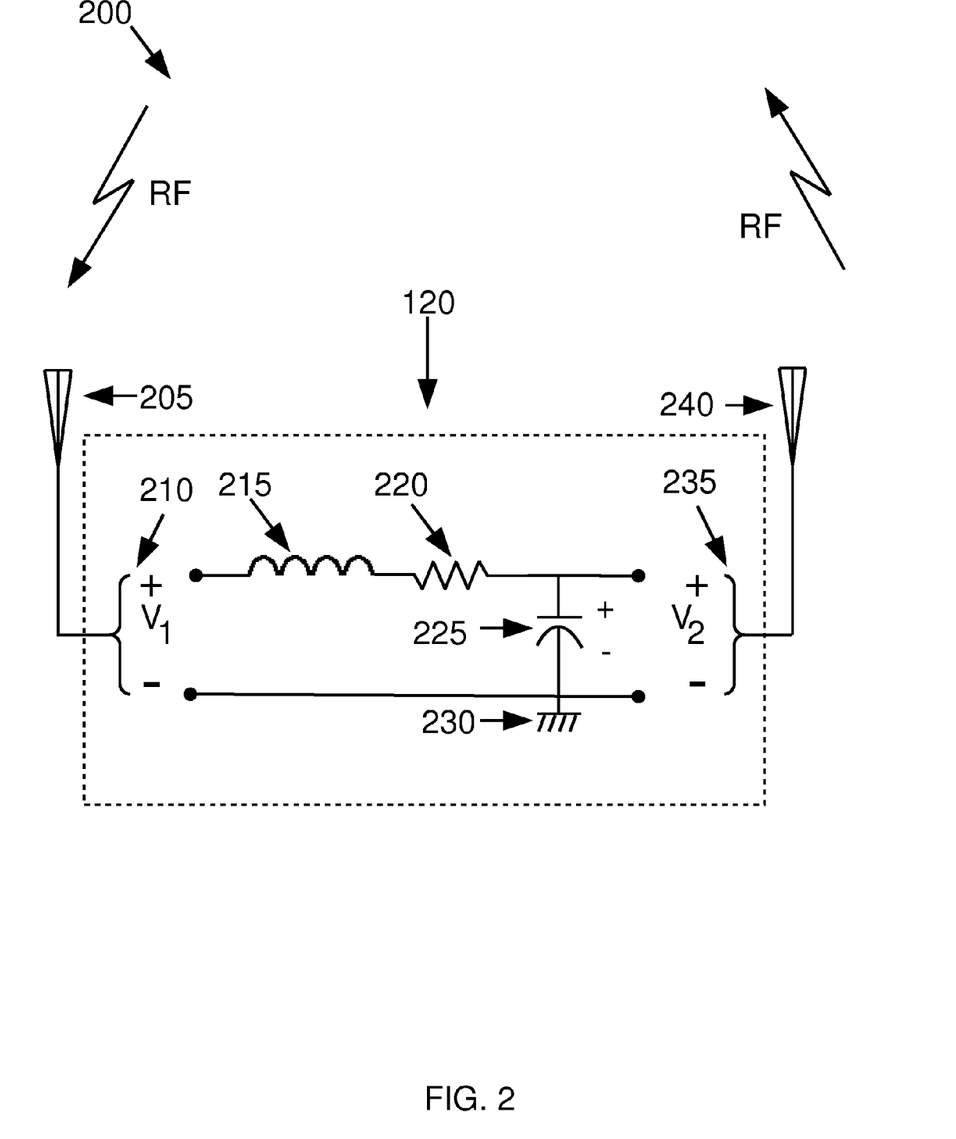
FIG. 2 is an illustration of an embodiment of a distributed resonator for the extended range wireless charging and powering system.

FIG. 2 is an illustration of an embodiment 200 of the distributed resonator 120 for the extended range wireless charging and powering system. The embodiment 200 of the distributed resonator 120 may comprise a RF receiving antenna 205, an input port 210 having a positive terminal and a negative terminal, an output port 235 having a positive terminal and a negative terminal, a first electrical leg comprising the positive terminal of the input port 210, the positive terminal of the input port 210 connected in series to an inductor 215, the inductor 215 connected in series to a resistor 220, and the resistor 220 connected in series to the positive terminal of the output port 235, a second electrical leg parallel to the first electrical leg and connecting the negative terminal of the input port 210 and the negative terminal of the output port 235, and a capacitor 225 having a positive terminal and a negative terminal, the positive terminal of the capacitor 225 connected to the first electrical leg between the resistor 220 and the positive terminal of the output port 235 and the negative terminal of the capacitor 225 connected to the second electrical leg between the negative terminal of the input terminal 210 and the negative terminal of the output terminal 235, a ground terminal 230 grounding the second electrical leg, and a RF transmitting antenna 240.

The RF receiving antenna 205 receives the radio frequency energy and conducts the radio frequency energy as electrical energy. The RF receiving antenna 205 may be tuned for receiving a specific band of radio frequency energy, or may be untuned for receiving broad-spectrum radio frequency energy. The electrical current is conducted to the input port 210.

The practical quality factor (Q) of the antenna 205 is usually higher than 10. This means the tuning capacitor 225 across antenna magnifies the RF signal more than 10 times.

The input port 210 delivers the electrical current to the active components of the distributed resonator 200. In some embodiments, the electrical current may be direct current. In some embodiments, the electrical current may be alternating current.

As shown in FIG. 2, the inductor 215, the resistor 220 and the capacitor 225 form a series RLC circuit. The inductor 215 and resistor 220 represent the characteristics or equivalent circuit of the antenna along the positive leg of the distributed resonator 120, with the capacitor 225 grounded to the negative leg of the distributed resonator 120. The capacitor 225 assures the antenna will resonate at the operating frequency. At $\omega_0 = 2\pi f_0$ (where $f_0$ is the resonance frequency), the impedance of the capacitor and the inductor become equal and cancel each other. Formula 1 describes the impedance of the network ($Z_1$) seen at the input port 210.

$$Z_1 = \frac{1}{j\omega C} + j\omega L + R = R + j\omega L\left(1 - \frac{\omega_0^2}{\omega^2}\right) \quad (1)$$

Formula 2 describes the resonance frequency $$\omega_0 = \frac{1}{\sqrt{LC}} \text{ and } j^2 = -1. \quad (2)$$

When $\omega=\omega_0$, the impedance at the input port 210 ($V_1$) becomes minimum and equal to resistance R, and therefore the voltage across resistor 220 becomes equal to the voltage at input port 210 ($V_1$).

Formula 3 gives the voltage drop across the capacitor C ($V_2$) at the resonance frequency.

$$V_C = \frac{1}{j\omega_0 C} I_1 = \frac{1}{j\omega_0 C} \frac{V_1}{R} = -jQV_1. \quad (3)$$

Formula 4 gives the voltage drop across the inductor L ($V_L$) at the resonance frequency.

$$V_L = j\omega_0 L I_1 = j\omega_0 L \frac{V_1}{R} = jQV_1. \quad (4)$$

Q is the quality factor of the series RLC network at the antenna 205. Usually, Q is much larger than one for a good antenna design which means the voltage drop across capacitor C ($V_2$) and the inductor L ($V_L$) at the resonance frequency $\omega_0$ can be much higher than the voltage applied to the input port 210 ($V_1$) so that $V_2 \gg V1$.

To achieve optimal performance, the following relationships apply. Theses values are approximate as the true ambient radio frequencies may differ from the values presented here. Ideally, the transmitter power is adjusted so that they received power at the antenna ranges from about 1 to 13 dBm.

Table of Component Values for Exemplary Embodiments*

| Type of Field Coupling | Ambient RF [Hertz] | Inductor 215 [Henries] | Resistor 220 [Ohms] | Capacitor 225 [Farad] |
|---|---|---|---|---|
| Near | 125 kHz | 2 mH | 20 Ω | 810 pF |
| Near | 13.56 MHz | 4.7 uH | 4.5 Ω | 29 pF |
| Far | 850 MHz | 20 nH | 1 to 50 Ω | 1.75 pF |
| Far | 1900 MHz | 5 nH | 1 to 50 Ω | 1.4 pF |
| Far | 2400 MHz | 3.5 nH | 1 to 50 Ω | 1.2 pF |
| Far | 5000 MHz | 1 nH | 1 to 50 Ω | 1 pF |

*Persons skilled in the art will recognize that the ambient RF values are approximate in that the value indicates the name assigned to a range (band) of frequencies according to a standard in a relevant technology field as noted above. In addition, the actual frequency used may vary according to the components in the apparatus. The actual frequency used, however, will not significantly affect the output power compared to another frequency in the assigned range (band).
*Similarly, persons skilled in the art will recognize that the component values are approximate to indicate a labeled value rather an actual value, which may vary according to normal tolerances and variations. The actual component value used will not significantly affect the output power compared to another value similarly labeled.

The antenna resistance R is required for impedance matching and the loss of the metal interconnects will only reduce $V_2$ slightly without any significant impact. This resonance amplification helps extending the range of the wireless charging and powering system.

The RF transmitting antenna 240 then transmits the electrical energy as radio frequency energy. For a transmitter with a 1 W output power (equivalent to 30 dBm), a seven-meter distance for a normal indoor environment will create 17 dBm power loss reducing the received power at the distributed resonance system to 13 dBm of power. Obviously, other conditions such as humidity, temperature and interference can deviate these ideal numbers. The circuit diagram for each distributed resonance block is shown in the following figure.

In some embodiments, a plurality of distributed resonators 200 (a.k.a. distributed near field resonance circuits) may be placed between an energy source transmitter and a charging load receiver to extend the operating range without the need of increasing the transmitter power as shown in the figure.

Figure 3:
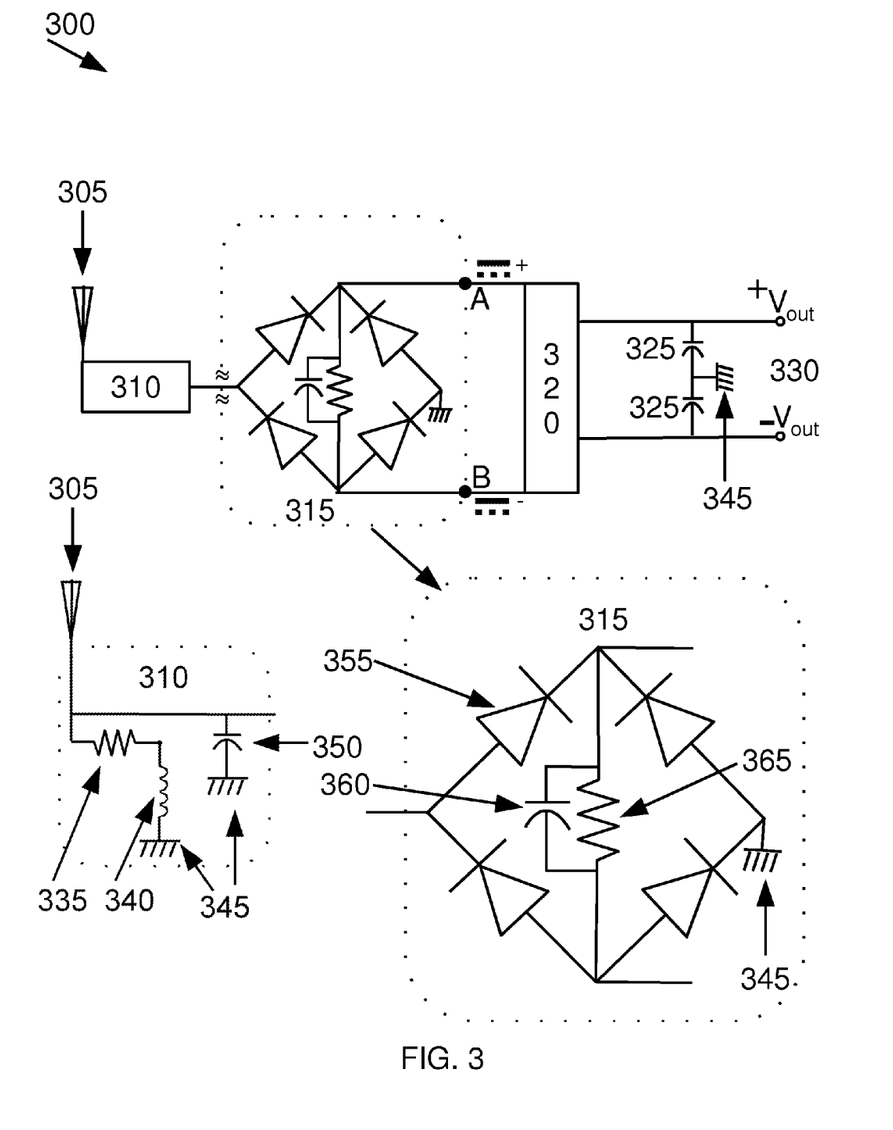
FIG. 3 illustrates the exemplary embodiment of a double-polarity receiver-multiplier for the extended range wireless charging and powering system.

FIG. 3 illustrates the exemplary embodiment 300 of a double-polarity receiver-multiplier for the extended range wireless charging and powering system. The exemplary double-polarity receiver-multiplier 300 may comprise a receiving antenna 305, an antenna resonator 310, a rectifier 315, a voltage regulator 320, at least one energy storage device 325 and a pair of output terminals 330.

The receiving antenna 305 receives ambient or directed RF energy from the plurality of distributed resonators 200 and conducts the RF energy to the active components of the double-polarity receiver-multiplier. The receiving antenna 305, which is subjected to all ambient RF energy, may be configured to conduct a specific range of RF energy and may therefore be tuned for a predominate or particular RF range. The practical quality factor (Q) of the antenna is usually higher than 10. This means the tuning capacitor across antenna magnifies the RF signal more than 10 times.

The first of these active components is the antenna resonator 310. The antenna resonator 310 may comprise a resistor 335, an inductor 340, a pair of ground contacts 345, and a capacitor 350. The resistor 335 and the inductor 340 are connected in series along one leg to a ground 345, and represent the characteristics of the antenna. The capacitor 350 is connected to a second leg in parallel to the rectifier 335 and inductor 340, and is likewise grounded. This configuration capacitor 350 assures the antenna will resonate at the operating frequency, enhancing the RF energy conducted to the rectifier 315. To assure proper polarity, the negative terminal of the capacitor 350 is oriented towards the ground 345.

The rectifier 315 receives the RF energy as alternating current with frequency f0 as output by the antenna resonator 310. In this conventional connection, the rectifier 315 has an input terminal connected to the antenna resonator 310, a ground terminal, a positive output terminal, and a negative output terminal. The rectifier 315 may comprise a plurality of diodes 355 configured to receive the incoming alternating current from the antenna resonator 310 and convert it to outgoing full-wave direct current to points A (the positive output terminal) and B (the negative output terminal). The minimum detectable signal depends on the forward ON voltage ($V_{ON}$) of the schottky diodes used in the rectifier circuit. The nominal ON voltage for these diodes is usually 0.2V. Therefore, the minimum detectable signal at the receiving antenna can be as low as 20 mV ($V_{ON}/Q$). This translates to 10*log(20)=13 dBm power at the receiver.

The rectifier 315 may also comprise a capacitor 360 or other electrical storage device, and a resistor 365 connected in parallel to each other and as a pair connected between points A and B, i.e. between the output terminals of the rectifier 315. The capacitor 360 and resistor 365 represent the overall input impedance of the voltage regulator 320. Usually, the capacitor 360 and the resistor 365 are very large so that the output voltage of the rectifier 315 is almost a direct DC voltage with a value proportional to the magnitude of the RF signal at the output of the resonator 310.

The capacitor 360 is oriented so that its positive terminal is towards point A, the positive output terminal, and its negative output terminal is towards point B, the negative output terminal. In addition to completing the circuit, the ground 345 also handles spurious current coursing through the rectifier 315.

The voltage regulator 320, which is connected between points A and B to receives the full-wave direct current from points A and B as output by the rectifier 315. As is typical with full-wave rectifiers, voltage variations are present in the incoming direct current, which must be moderated to a narrow consistent voltage for beneficial use. The voltage regulator 320 moderates the fluctuating incoming voltage to a consistent output voltage $^+V_{out}$, with one terminal at a consistent positive voltage $V_0$, and a second terminal at a consistent negative voltage $^-V_{out}$. The voltage regulator 320 is also capable of changing the value of the output voltage to a proper DC value suited for charging portable device applications.

The at least one energy storage device 325 is connected in parallel between the positive and negative terminals of the voltage regulator 320, receives the electrical energy from the voltage regulator 320, and stores the electrical energy for delivery on demand to the output terminals 330. The at least one energy storage device 325 also provides a beneficial effect of smoothing voltage variations output from the voltage regulator 320. The at least one energy storage device 325 may be optional in embodiments. In some embodiments, the at least one energy storage device 325 may be a capacitor. In some embodiments, the at least one energy storage device 325 may be a battery, or any other device for storing electrical energy. In some embodiments, the at least one energy storage device 325 may convert the electrical energy to another form energy, i.e. potential, kinetic, or chemical, or later use. To assure proper polarity, the positive terminal of the at least one energy storage device 325 is oriented towards the terminals with higher voltage levels at the output terminals 330. The size of the at least one energy storage device 325 is increased to accommodate larger power consumption of the charging device 125.

The output terminals 330 provide contact points for delivery of the RF energy received by the receiver-converter 300 and converted into electrical energy as output by the voltage regulator 320. The power level at the output terminals 330 depends on the RF energy received at the antenna 305.

Figure 4:
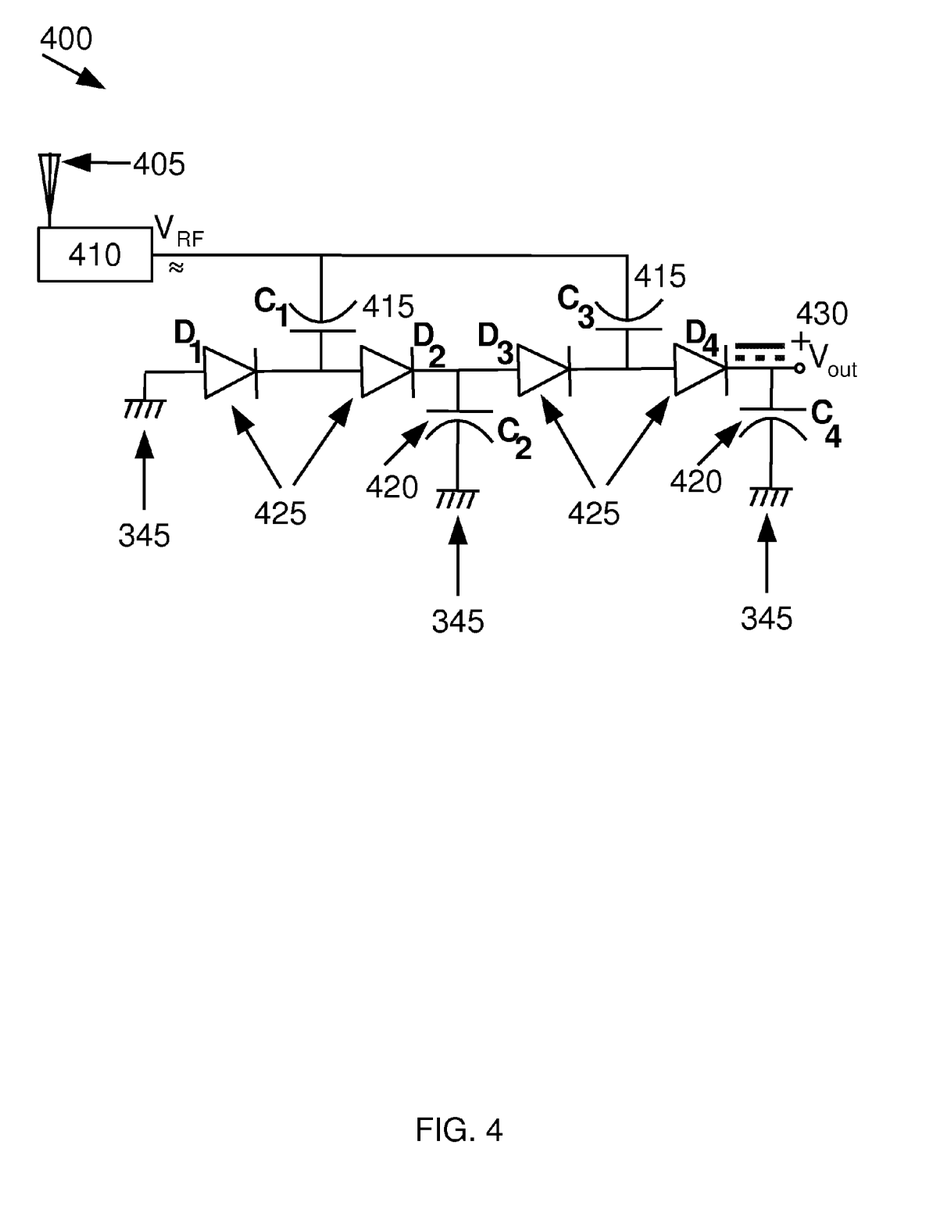
FIG. 4 illustrates the exemplary embodiment of a positive voltage receiver-multiplier for the extended range wireless charging and powering system.

FIG. 4 illustrates an exemplary embodiment 400 of a positive voltage receiver-multiplier for the extended range wireless charging and powering system. The exemplary positive voltage receiver-multiplier 400 may replace the rectifier 315 at point A of FIG. 3. The exemplary positive voltage receiver-multiplier 400 may comprise an RF energy receiving antenna 405, an antenna resonator 410, a plurality of odd-order capacitors 415, a plurality of even-order capacitors 420, a plurality of grounds 345, a plurality of rectifying diodes 425 and the output terminal 430.

As with the exemplary receiver-converter 300, the RF receiving antenna 405 receives ambient or directed RF energy from the plurality of distributed resonators 200 and conducts the RF energy to the circuit components of the exemplary positive voltage receiver-multiplier 400. The receiving antenna 405, which is subjected to all ambient RF energy, may be configured to conduct a specific range of RF energy and may therefore be tuned for a predominate or particular RF range.

In some embodiments, the RF energy is conducted to an antenna resonator 410. The antenna resonator 410 is similar to the antenna resonator 310. The antenna resonator 410 may comprise a resistor 335, an inductor 340 and a pair of ground contacts 345. The resistor 335 and inductor 340 represent the characteristics of the antenna. During the first negative cycle of $V_{RF}$, D1 is ON and C1 charges to the peak level of $V_{RF}$. During the first positive cycle of $V_{RF}$, D2 become ON and C2 charged to twice the peak level of $V_{RF}$. During the next negative cycles of $V_{RF}$, D3 becomes ON and C3 charges to three times the peak level of $V_{RF}$. During the next positive cycles of $V_{RF}$, D4 becomes ON and C4 charges to four-times of $V_{RF}$.

The output terminal 430 provides a contact point for use or storage of the positive voltage $V_{out}$. An advantage of using the voltage receiver-multiplier is increasing the magnitude of the rectified signal at $V_{out}$.

The plurality of odd-order capacitors 415 are selected with the negative terminals oriented towards the antenna resonator 410 to conduct current to the output terminal 430.

The plurality of even-order capacitors 420 is selected with the negative terminals oriented towards the grounds 345. The capacitor in the antenna resonator 410 is the effective capacitance of the positive voltage receiver-multiplier comprised of 415, 420 and 425 components.

The rectifying diodes 425 are oriented with the cathode terminal towards the output terminal 430 and the positive terminals towards the ground 345.

The minimum detectable signal depends on the forward ON voltage ($V_{ON}$) of the schottky diodes used in the rectifier circuit. The nominal ON voltage for these diodes is usually 0.2V. Therefore, the minimum detectable signal at the receiving antenna can be as low as 20 mV ($V_{ON}$/Q). This translates to $10*\log(20)=13$ dBm power at the receiver.

Figure 5:
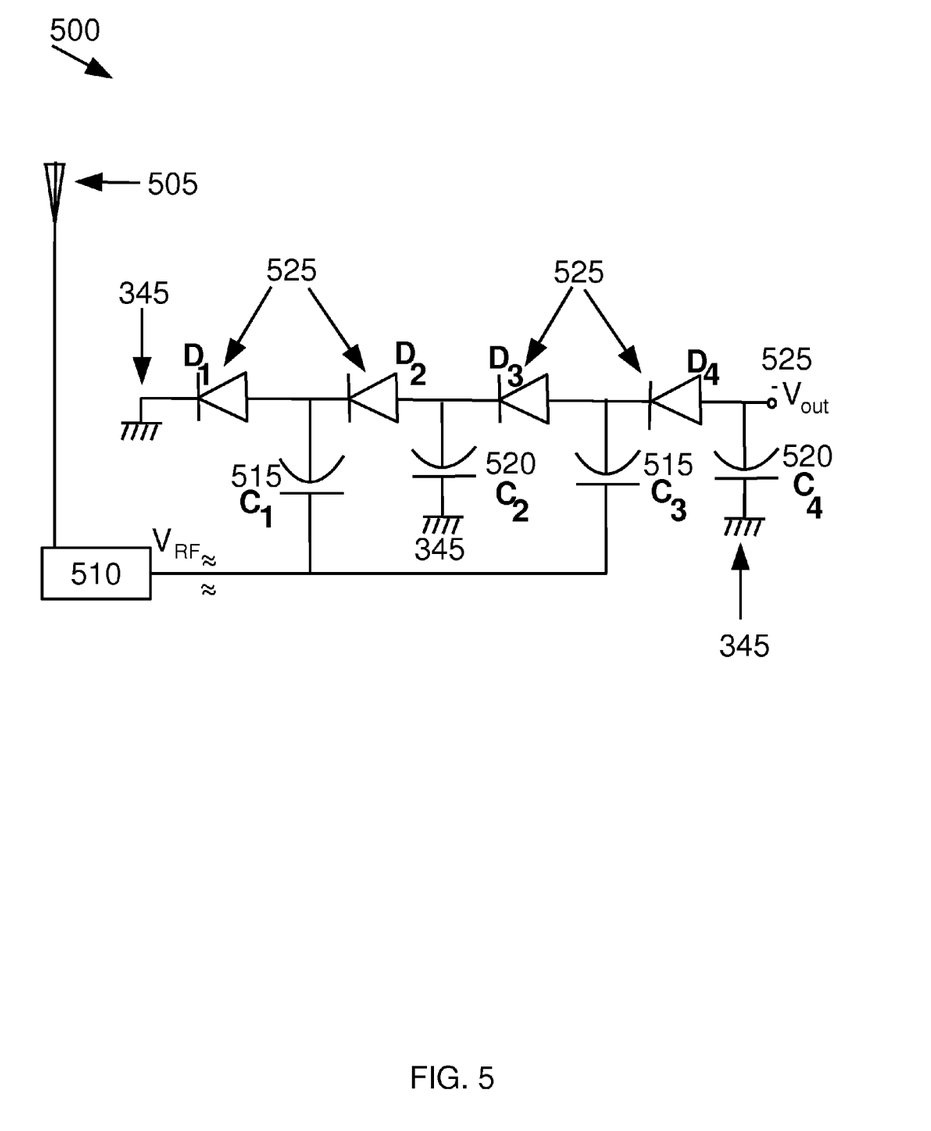
FIG. 5 illustrates the exemplary embodiment of a negative voltage receiver-multiplier for the extended range wireless charging and powering system.

FIG. 5 illustrates the exemplary embodiment 500 of a negative voltage receiver-multiplier for the extended range wireless charging and powering system. The exemplary negative voltage receiver-multiplier 400 may replace the rectifier 315 at point B of FIG. 3. The exemplary negative voltage receiver-multiplier 500 may comprise an RF energy receiving antenna 505, an antenna resonator 510, a plurality of odd-order capacitors 515, a plurality of even-order capacitors 520, a plurality of grounds 345, a plurality of rectifying diodes 525 and the output terminal 530.

As with the exemplary receiver-converter 300, the RF receiving antenna 505 receives ambient or directed RF energy from the plurality of distributed resonators 200 and conducts the RF energy to the circuit components of the exemplary negative voltage receiver-multiplier 500. The receiving antenna 505, which is subjected to all ambient RF energy, may be configured to conduct a specific range of RF energy and may therefore be tuned for a predominate or particular RF range.

In some embodiments, the RF energy is conducted to an antenna resonator 510. The antenna resonator 510 is similar to the antenna resonator 310. The antenna resonator 510 may comprise a resistor 335, an inductor 340, and a pair of ground contacts 345. The resistor 335 and the inductor 340 represent the characteristics of the antenna. During the first negative cycle of $V_{RF}$, D1 is ON and C1 charges to the peak level of $V_{RF}$. During the first positive cycle of $V_{RF}$, D2 become ON and C2 charged to twice the peak level of $V_{RF}$. During the next negative cycles of $V_{RF}$, D3 becomes ON and C3 charges to three times the peak level of $V_{RF}$. During the next positive cycles of $V_{RF}$, D4 becomes ON and C4 charges to four-times of $V_{RF}$.

The output terminal 530 provides a contact point for use or storage of the negative voltage $V_{out}$. An advantage of using the voltage receiver-multiplier is increasing the magnitude of the rectified signal at $V_{out}$.

The plurality of odd-order capacitors 515 is selected with the negative terminals towards the antenna resonator 510 to conduct current to the output terminal 530.

The plurality of even-order capacitors 520 is selected with the positive terminals oriented towards the grounds 345. The capacitor in the antenna resonator 510 is the effective capacitance of the positive voltage receiver-multiplier comprised of the plurality of odd-order capacitors 515, the plurality of even-order capacitors 520 and the rectifying diodes 525.

The rectifying diodes 525 are oriented with the anode terminal towards the output terminal 530 and the negative terminals towards the ground 345.

The minimum detectable signal depends on the forward ON voltage ($V_{ON}$) of the schottky diodes used in the rectifier circuit. The nominal ON voltage for these diodes is usually 0.2V. Therefore, the minimum detectable signal at the receiving antenna can be as low as 20 mV ($V_{ON}/Q$). This translates to 10*log(20)=13 dBm power at the receiver.

Figure 6:
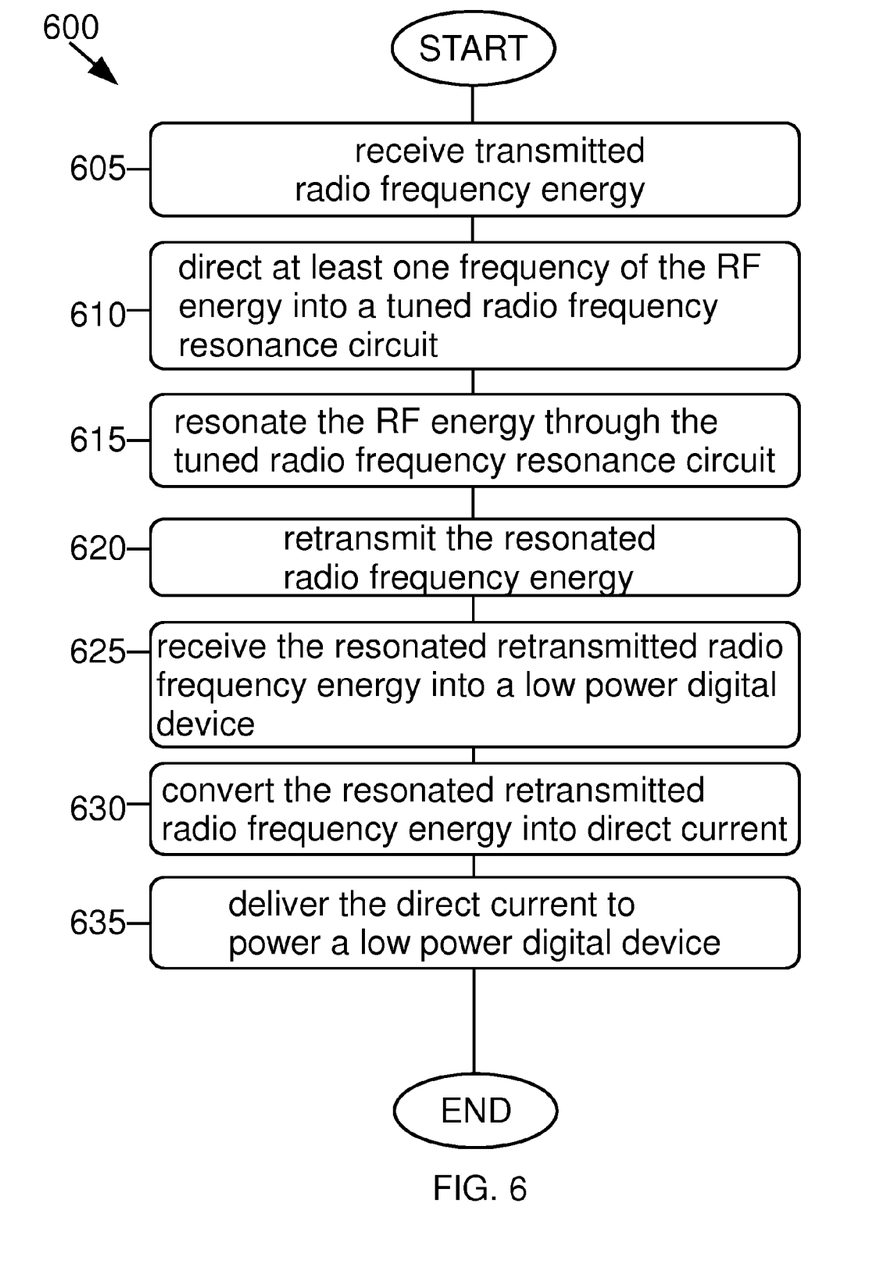
FIG. 6 illustrates the exemplary method for the extended range wireless charging and powering system.

FIG. 6 illustrates the exemplary method for the extended range wireless charging and powering system.

At step 605, transmitted radio frequency energy is received. The radio frequency energy may be low energy received over a short distance or high-energy over a long distance, or the radio energy may be received through an electro-magnetically coupled distance.

At step 610, at least one frequency of the radio frequency energy is directed into a tuned radio frequency resonance circuit.

At step 615, the radio frequency energy is resonated through the tuned radio frequency resonance circuit.

At step 620, the resonated radio frequency energy is retransmitted.

At step 625, the resonated retransmitted radio frequency energy may be received into a low power digital device.

At step 630, the resonated retransmitted radio frequency energy may be converted into direct current.

At step 635, the direct current may be delivered to power low power digital device.

Figure 7:
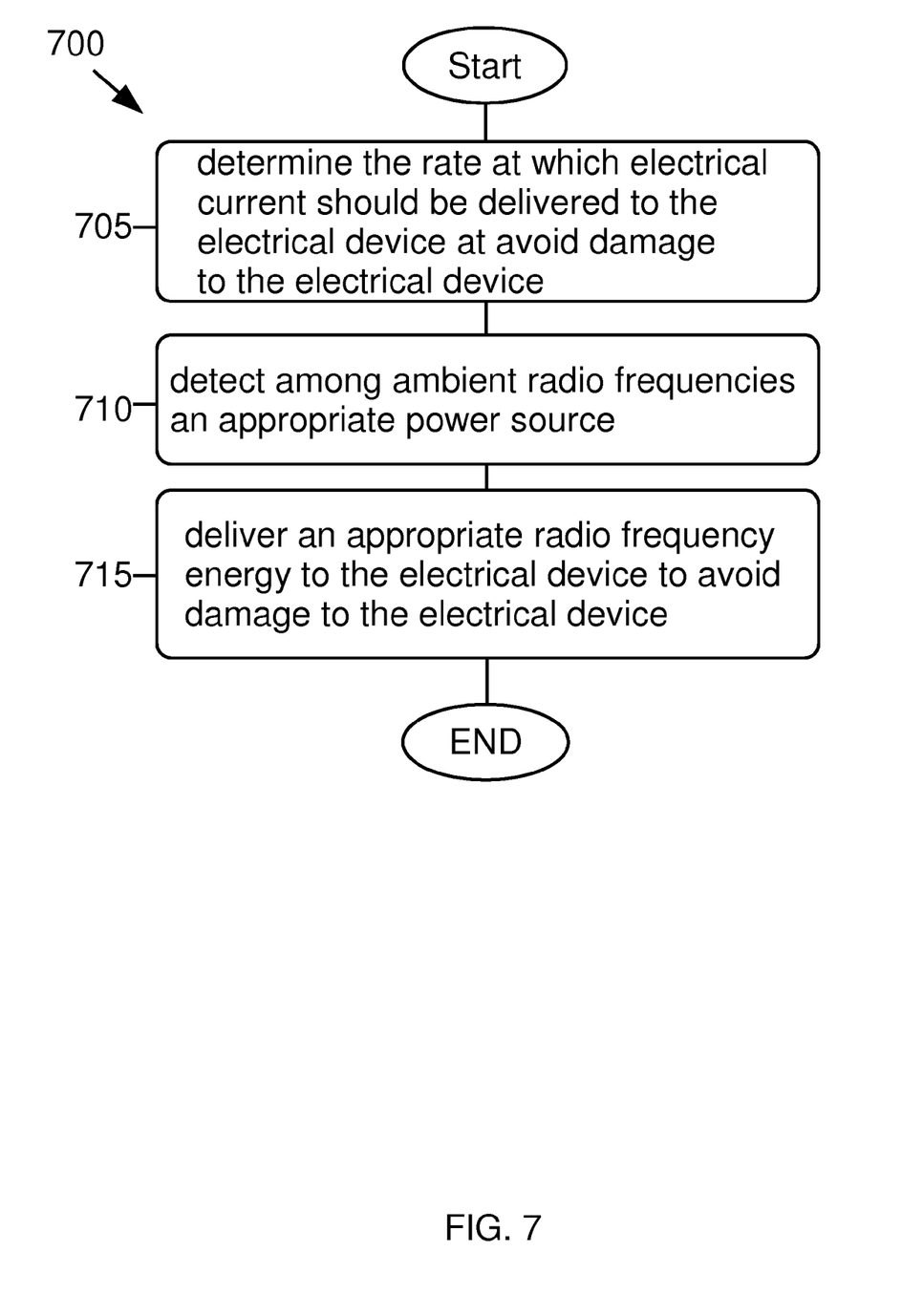
FIG. 7 illustrates an embodiment for delivering an appropriate radio frequency energy to an electrical device to avoid damage the electrical device.

FIG. 7 illustrates a method for delivering an appropriate radio frequency energy to an electrical device to avoid damage to the electrical device. The amount of energy in an electromagnetic wave is a function of its frequency and density. This method provides for moderating the delivery of electrical current to an electrical device by selecting an appropriate radio frequency present in the appropriate density. This method avoids the need for circuitry typically used to moderate electrical current from high-power electrical current systems.

At step, 705, the rate at which electrical current should be delivered to the electrical device to avoid damage to the electrical device is determined. This determination may be made by evaluating the level of charge in the electrical device's battery.

At step 710, an appropriate power source is detected among ambient radio frequencies. This step allows matching the delivery of current derived from radio frequency energy to the electrical device to avoid damage to the electrical device Some examples of ambient radio frequencies are WiFi (e.g., 2400 MHz, 5800 MHz), Bluetooth (e.g., 2402-2480 MHz), radio frequency identification systems (RFID, e.g., 125 kHz, 13.56 MHz), WiMAX (e.g., 2.3-2.5 GHz and 3.4-3.5 GHz), ZigBee (a.k.a. personal area networks in the 915 MHz and 2450 MHz.) or Near Field Communication (NFC) systems. Other examples may be radio frequencies from point-to-point communication antennas, radio and television broadcasting, cellular telephones (e.g., 850 (i.e., 800-900) MHZ, 1800 MHz, 1900 MHZ, etc.), personal communications services, pagers, cordless telephones (e.g., 1900 (i.e., 1929-1930) MHz, 2400 MHz, etc.), business radio, radio communications for police and fire departments, amateur radio, and satellite communications, long-distance transmission towers, radar and other industrial applications.

At step 715, an appropriate radio frequency energy is delivered to the electrical device to avoid damage to the electrical device.

Figure 8:
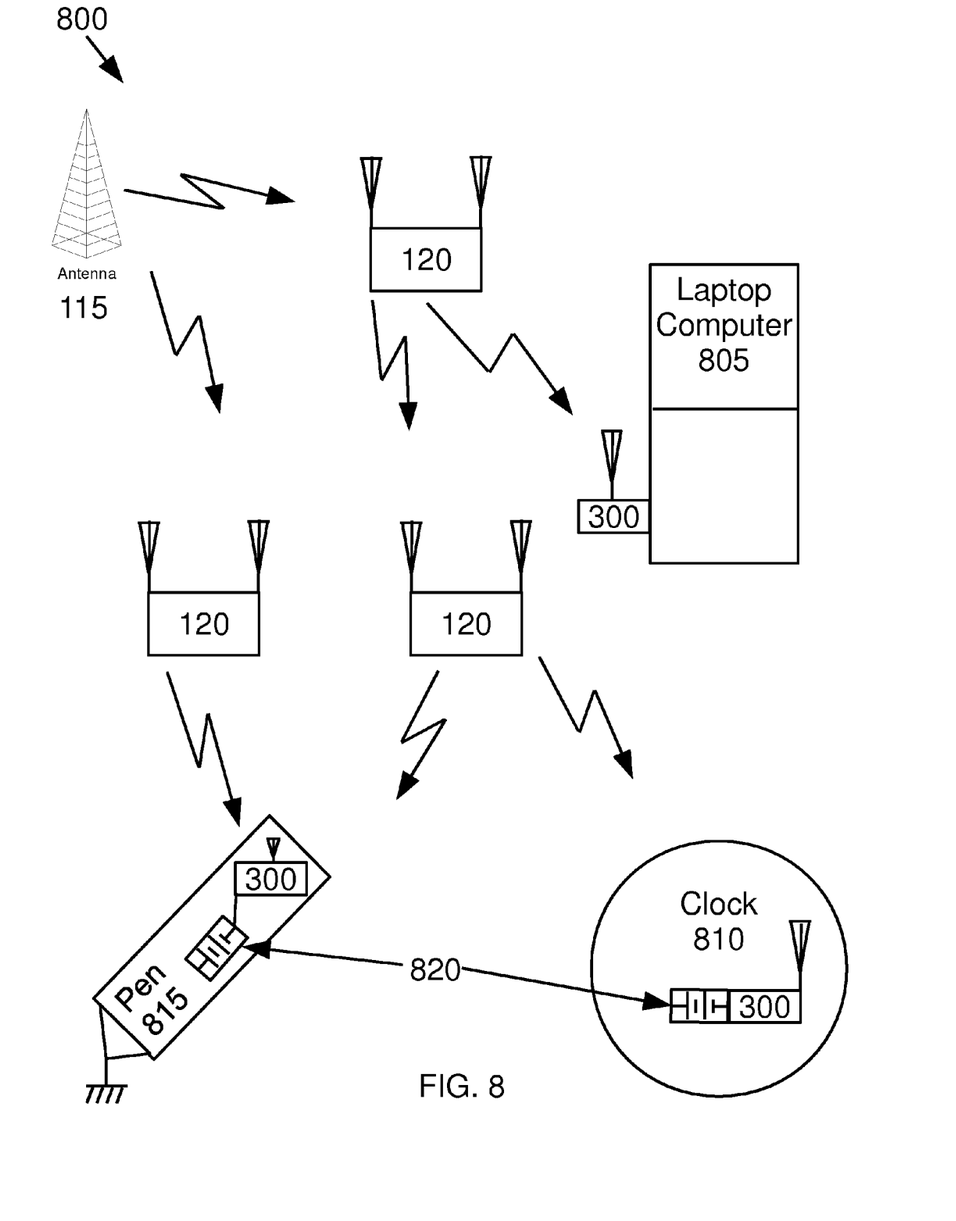
FIG. 8 illustrates some exemplary applications for the extended range wireless charging and powering system.

FIG. 8 illustrates exemplary applications of the extended range wireless charging and powering system and devices. The embodiment of these exemplary applications of the extended range wireless charging and powering system and devices may include the commercial or private radio frequency antenna 115, a plurality of the distributed resonators 120, one or more of the bi-directional receiver-converters 300 for extended range wireless charging, a laptop computer 805, a clock 810, an electronic pen 815, and one or more optional batteries 820.

The commercial or private radio frequency antenna 115, the plurality of the distributed resonators 120, and the one or more of the bi-directional receiver-converters 300 for extended range wireless charging function as described herein. The antenna 115 represents a source of radio frequency energy. The plurality of the distributed resonators 120 extends the range of the radio frequency energy to digital devices. The one or more of the bi-directional receiver-converters 300 for extended range wireless charging function receive radio frequency energy and convert the radio frequency energy into electrical energy for powering or charging digital devices.

As shown by example 805, in some embodiments the extended range wireless charging and powering system and devices may include a laptop computer. In this instance, the bi-directional receiver-converter 300 may be packaged in an USB device for providing power to the laptop computer.

In some embodiments the extended range wireless charging and powering system and devices may include a clock 810 or other electronic device. In this instance, the bi-directional receiver-converter 300 may be packaged within the clock 810 or other electronic device and provide power for operating the clock or other electronic device. In some embodiments, the clock 810 or other electronic device may include a battery 820 for powering the clock 810 or other electronic device if and when the radio frequency energy density is insufficient to power the clock 810 or other electronic device.

In some embodiments the extended range wireless charging and powering system and devices may include an electronic pen 815 or other digital device. In this instance, the bi-directional receiver-converter 300 may be packaged within the electronic pen 815 or other digital device and provide power for operating the electronic pen or other digital device. In some embodiments, the electronic pen 815 or other digital device may include a battery 820 for powering the electronic pen 815 or other digital device if and when the radio frequency energy density is insufficient to power the electronic pen 815 or other digital device.

The embodiments discussed herein are descriptive of the present invention as described with reference to the drawings. Modifications of the methods or specific structures may be apparent to those skilled in the art. All such modifications, adaptations, or variations that rely on the teachings of the present invention, and through which these teachings have advanced the art, are within the spirit and scope of the present invention. These descriptions and drawings should not be considered as limiting as the present invention is not limited to only the embodiments illustrated.

What is claimed is:

1. A distributed resonance apparatus for extended range wireless powering and charging of a low-power electrical device comprising:
    a receiving antenna for receiving radiated energy having at least one frequency in the radio frequency range;
    an input port connected to the receiving antenna, the input port having a positive terminal and a negative terminal;
    a first electrical leg comprising the positive terminal of the input port, the positive terminal connected in series to a first end of an inductor, a second end of the inductor connected in series to a first end of a resistor, a second end of the resistor connected in series to a positive terminal of an output port;
    a second electrical leg comprising the negative terminal of the input port, an electrical ground, a negative terminal of an output port, and a capacitor connected in parallel between the ground and the positive terminal of the input port wherein the first electrical leg and the second electrical leg induce resonance in the at least one frequency in the radio frequency range; and
    a transmitting antenna for wirelessly transmitting the resonated radio frequency energy.

2. The distributed resonance apparatus for extended range wireless powering and charging of a low-power electrical device of claim 1 wherein the at least one frequency in the radio frequency range is approximately 125 kHz.

3. The distributed resonance apparatus for extended range wireless powering and charging of a low-power electrical device of claim 1 wherein the at least one frequency in the radio frequency range is approximately 13.56 MHz.

4. The distributed resonance apparatus for extended range wireless powering and charging of a low-power electrical device of claim 1 wherein the at least one frequency in the radio frequency range is approximately 850 MHz.

5. The distributed resonance apparatus for extended range wireless powering and charging of a low-power electrical device of claim 1 wherein the at least one frequency in the radio frequency range is approximately 1900 MHz.

6. The distributed resonance apparatus for extended range wireless powering and charging of a low-power electrical device of claim 1 wherein the at least one frequency in the radio frequency range is approximately 2400 MHz.

7. The distributed resonance apparatus for extended range wireless powering and charging of a low-power electrical device of claim 1 wherein the at least one frequency in the radio frequency range is approximately 5000 MHz.

8. The distributed resonance apparatus for extended range wireless powering and charging of a low-power electrical device of claim 1 further comprising a radio frequency transmitting circuit for transmitting the radio frequency energy through an electro-magnetically coupled short distance.

9. The distributed resonance apparatus for extended range wireless powering and charging of a low-power electrical device of claim 1 further comprising an electro-magnetic strength detection circuit for determining the distance between the radio frequency transmitting circuit and a radio frequency energy receiving circuit.

10. The distributed resonance apparatus for extended range wireless powering and charging of a low-power electrical device of claim 1 further comprising
    a circuit for receiving the retransmitted and resonated radio frequency energy;
    a circuit for converting the retransmitted and resonated radio frequency energy into direct current; and
    a circuit for delivering the direct current to a low-power electrical device.

11. The distributed resonance apparatus for extended range wireless powering and charging of a low-power electrical device of claim 10 wherein the circuit for converting the retransmitted and resonated radio frequency energy into direct current comprises a double-polarity receiver-multiplier device comprising a plurality of odd-order capacitors and a plurality of even-order capacitors and a plurality of rectifying diodes.

12. The distributed resonance apparatus for extended range wireless powering and charging of a low-power electrical device of claim 10 wherein the circuit for converting the retransmitted and resonated radio frequency energy into direct current comprises a plurality of odd-order capacitors and a plurality of even-order capacitors and a plurality of rectifying diodes for charging and powering of a low-power electrical device.

13. The distributed resonance apparatus for extended range wireless powering and charging of a low-power electrical device of claim 10 wherein the circuit for converting the retransmitted and resonated radio frequency energy into direct current comprises a plurality of odd-order capacitors and a plurality of even-order capacitors and a plurality of rectifying diodes for charging and powering of low-power electrical devices.

\* \* \* \* \*